United States Patent [19]
Lindsay et al.

[11] Patent Number: 5,821,545
[45] Date of Patent: Oct. 13, 1998

[54] HEATED STAGE FOR A SCANNING PROBE MICROSCOPE

[75] Inventors: Stuart M. Lindsay; Tianwei Jing, both of Tempe, Ariz.

[73] Assignee: Molecular Imaging Corporation, Tempe, Ariz.

[21] Appl. No.: 729,395

[22] Filed: Oct. 11, 1996

Related U.S. Application Data

[63] Continuation-in-part of Ser. No. 551,836, Nov. 7, 1995, Pat. No. 5,654,546.

[51] Int. Cl.$^6$ ..................................................... H01J 37/20
[52] U.S. Cl. ............................................................ 250/443.1
[58] Field of Search .......................................... 250/443.1

[56] References Cited

U.S. PATENT DOCUMENTS

| Re. 33,387 | 10/1990 | Binnig ...................................... | 250/306 |
| Re. 33,587 | 5/1991 | Harnden, Jr. et al. .................. | 29/25.35 |
| Re. 34,331 | 8/1993 | Elings et al. ............................. | 250/306 |

(List continued on next page.)

FOREIGN PATENT DOCUMENTS 06-59004   3/1994   Japan ............................. G01R 33/02

OTHER PUBLICATIONS

Jung, P.S., et al., "Novel Stationary–Sample Atomic Force Microscope with Beam–Tracking Lens", Electronics Letters, Feb. 4, 1993, vol. 29, No. 3, pp. 264–265.

Binnig, G., et al., "Single–tube three–dimensional scanner for scanning tunneling microscopy", Review of Scientific Instruments, Aug. 1986, vol. 57, No. 8, pp. 1688–1689.

Drake, B., et al., "Imaging Crystals, Polymers, and Processes in Water with the Atomic Force Microscope", Science, vol. 243, pp. 1586–1589.

Sonnenfeld, Richard, et al., "Atomic–Resolution Microscopy in Water", Science, Apr. 11, 1986, vol. 232, pp. 211–213.

Davidsson, P., et al., "A new symmetric scanning tunneling microscope design", Journal of Vacuum Science & Technology: Part A, Mar./Apr. 1988, No. 2, pp. 380–382.

Marti, O., et al., "Atomic force microscopy of liquid–covered surfaces: Atomic resolution images", Applied Physics Letters, Aug. 17, 1987, vol. 51, No. 7, pp. 484–486.

Kirk, M.D., et al., "Low–temperature atomic force microscopy", Review of Scientific Instruments, Jun. 1988, vol. 59, No. 6, pp. 833–835.

Sonnenfeld, Richard, et al., "Semiconductor topography in aqueous environments: Tunneling microscope of chemomechanically polished (001) GaAs", Applied Physics Letters, Jun. 15, 1987, vol. 50, No. 24, pp. 1742–1744.

Martin, Y., et al., "Atomic force microscope–force mapping and profiling on a sub 100–Å scale", Journal of Applied Physics, May 15, 1987, vol. 61, No. 10, pp. 4723–4729.

Travaglini, G., et al., "Scanning Tunneling Microscopy on a Biological Matter", Surface Science, 1987, vol. 181. pp. 380–390.

Ohnesorge, F., et al., "True Atomic Resolution by Atomic Force Microscopy Through Repulsive and Attractive Forces", Science, Jun. 4, 1993, vol. 260, pp. 1451–1456.

(List continued on next page.)

*Primary Examiner*—Jack I. Berman
*Attorney, Agent, or Firm*—Killworth, Gottman, Hagan & Schaeff, L.L.P.

[57] ABSTRACT

A heater for use in heating a sample stage of a microscope such as a scanning probe microscope is bonded to a sample stage which sits on a tube of a ceramic thermal insulator which is, in turn, mounted within or part of a tube of the same material. This re-entrant design provides an increased thermal path over straight line distances between the heater and the support structure for the sample stage and thus provides excellent thermal insulation, while also maximizing the thermal stability of the system.

9 Claims, 5 Drawing Sheets

U.S. PATENT DOCUMENTS

| | | | |
|---|---|---|---|
| Re. 34,489 | 12/1993 | Hansma et al. | 250/560 |
| 4,317,036 | 2/1982 | Chia-Gee Wang | 250/274 |
| 4,343,993 | 8/1982 | Binnig et al. | 250/306 |
| 4,591,722 | 5/1986 | Biddlecombe et al. | 250/443.1 |
| 4,724,318 | 2/1988 | Binnig | 250/306 |
| 4,747,698 | 5/1988 | Wickramasinghe et al. | 374/6 |
| 4,785,177 | 11/1988 | Beocke | 250/442.1 |
| 4,800,274 | 1/1989 | Hansma et al. | 250/306 |
| 4,806,755 | 2/1989 | Duerig et al. | 250/306 |
| 4,841,148 | 6/1989 | Lyding | 250/306 |
| 4,866,271 | 9/1989 | Ono et al. | 250/306 |
| 4,868,396 | 9/1989 | Lindsay | 250/440.1 |
| 4,871,938 | 10/1989 | Elings et al. | 310/328 |
| 4,877,957 | 10/1989 | Okada et al. | 250/306 |
| 4,894,537 | 1/1990 | Blackford et al. | 250/306 |
| 4,914,293 | 4/1990 | Hayashi et al. | 250/306 |
| 4,947,042 | 8/1990 | Nishioka et al. | 250/306 |
| 4,950,900 | 8/1990 | Takenchi et al. | 250/346 |
| 4,969,978 | 11/1990 | Tomita et al. | 204/153.1 |
| 5,013,913 | 5/1991 | Benner | 250/307 |
| 5,023,452 | 6/1991 | Purcell et al. | 250/306 |
| 5,025,658 | 6/1991 | Elings et al. | 73/105 |
| 5,047,637 | 9/1991 | Toda | 250/306 |
| 5,077,473 | 12/1991 | Elings et al. | 250/306 |
| 5,081,390 | 1/1992 | Elings | 310/328 |
| 5,103,095 | 4/1992 | Elings et al. | 250/306 |
| 5,106,729 | 4/1992 | Lindsay et al. | 435/6 |
| 5,120,959 | 6/1992 | Tomita | 250/306 |
| 5,144,833 | 9/1992 | Amer et al. | 73/105 |
| 5,155,715 | 10/1992 | Ueyema et al. | 369/44.11 |
| 5,157,251 | 10/1992 | Albrecht et al. | 250/216 |
| 5,166,615 | 11/1992 | Sidles | 324/307 |
| 5,172,002 | 12/1992 | Marshall | 250/561 |
| 5,189,906 | 3/1993 | Elings et al. | 73/105 |
| 5,200,616 | 4/1993 | Kokawa et al. | 250/306 |
| 5,202,004 | 4/1993 | Kwak et al. | 204/153.1 |
| 5,224,376 | 7/1993 | Elings et al. | 73/105 |
| 5,247,186 | 9/1993 | Toda | 250/561 |
| 5,253,516 | 10/1993 | Elings et al. | 73/105 |
| 5,260,577 | 11/1993 | Abraham et al. | 250/442.11 |
| 5,260,824 | 11/1993 | Okada et al. | 359/368 |
| 5,291,775 | 3/1994 | Gamble et al. | 73/105 |
| 5,294,804 | 3/1994 | Kajimura | 250/306 |
| 5,296,704 | 3/1994 | Mishima et al. | 250/306 |
| 5,307,693 | 5/1994 | Griffith et al. | 73/862.68 |
| 5,314,254 | 5/1994 | Yashar et al. | 384/49 |
| 5,317,153 | 5/1994 | Matshshiro et al. | 250/306 |
| 5,319,960 | 6/1994 | Gamble et al. | 73/105 |
| 5,325,010 | 6/1994 | Besocke et al. | 310/317 |
| 5,357,105 | 10/1994 | Harp et al. | 250/234 |
| 5,363,697 | 11/1994 | Nakagawa | 73/105 |
| 5,381,101 | 1/1995 | Bloom et al. | 324/676 |
| 5,388,452 | 2/1995 | Harp et al. | 73/105 |
| 5,410,910 | 5/1995 | Somlyo et al. | 73/105 |
| 5,438,206 | 8/1995 | Yokoyama et al. | 250/424.11 |
| 5,461,907 | 10/1995 | Tench et al. | 73/105 |
| 5,468,959 | 11/1995 | Tohda et al. | 250/306 |
| 5,481,521 | 1/1996 | Washizawa et al. | 369/99 |
| 5,497,000 | 3/1996 | Tao et al. | 250/307 |
| 5,504,366 | 4/1996 | Weiss et al. | 250/306 |
| 5,654,546 | 8/1997 | Lindsay | 250/306 |

OTHER PUBLICATIONS

Specht, Martin, et al., "Simultaneous measurement of tunneling current and force as a function of position through a lipid film on a solid substrate", Surface Science Letters, 1991, vol. 257, pp. L653–L–658.

Brede, M., et al., "Brittle crack propagation in silicon single crystals", Journal of Applied Physics, Jul. 15, 1991, vol. 70, No. 2, pp. 758–771.

Hansma, P.K., et al., Article (untitled) from Journal of Applied Physics, Jul. 15, 1994, vol. 76, No. 2, pp. 796–799.

Lindsay, S.M., et al., "Scanning tunneling microscopy and atomic force microscopy studies of biomaterials at a liquid–solid interface", Journal of Vacuum Science Technology/ Jul./Aug. 1993, vol. 11. No. 4, pp. 808–815.

Jarvis, S.P., et al., "A novel force microscope and point contact probe", Review of Scientific Instruments, Dec. 1993, vol. 64, No. 12. pp. 3515–3520.

Stewart, A.M., et al., "Use of magnetic forces to conttol distance in a surface force apparatus".

Yang, Jie, et al., "Atomic force microscopy of DNA molecules", 1992 Federation of European Biochemical Secoeties, Apr. 1992, vol. 301, No. 2, pp. 173–176.

Mou, Jianxun, et al., "An optical detection low temperature atomic force microscope at ambient pressure for biological research", Review of Scientific Instruments, Jun. 1993, vol. 64, No. 6, pp. 1483–1487.

Hamers, et al., "A scanning tunneling microscopy study of the reaction of si(001)–(2X1) with $NH_3$", J. Vac. Sci.Technol., Mar./Apr. 1988, A, vol. 6. No. 3, pp. 508–511.

HEATED STAGE FOR A SCANNING PROBE MICROSCOPE

CROSS-REFERENCE TO RELATED APPLICATION

This application is a continuation-in-part of U.S. patent application Ser. No. 08/551,836, now U.S. Pat. No. 5,654, 546, entitled "A Variable Temperature Scanning Probe Microscope Based On A Peltier Device" filed 7 Nov., 1995 in the name of inventor Stuart M. Lindsay.

BACKGROUND OF THE INVENTION

1. Field of the Invention

This invention relates to scanning probe microscopy. More particularly, the present invention relates to temperature control of samples under investigation in a scanning probe microscope.

2. The Prior Art

It is often desirable to control the temperature of a sample that is being studied in a scanning probe microscope (SPM) such as the scanning tunneling microscope (STM) or atomic force microscope (AFM). This is because many aspects of surface structure and chemistry are sensitive to temperature, so variable temperature operation adds greatly to the utility of the scanning probe microscope.

Scanning probe microscopes have been constructed which operate in a cryogenic fluid or inside a high vacuum chamber. In each case it is relatively straightforward to control the temperature of the sample (and/or the microscope as well). However, in the case of microscopes designed to operate in ambient air (or some gas at or near ambient pressure) it is more difficult to design a heated sample stage. The reason is that convection caused by hot gasses and temperature gradients across the microscope (the body of which is assumed to be at ambient temperature) causes mechanical instabilities which degrade the resolution of the microscope.

One solution to this problem is to make the heater very small, comparable in size to the probe of the microscope. The heated region itself can then be raised to a high temperature with a very small heat input, with the result that the rest of the sample stage and microscope is not disturbed. Such an arrangement has been built by M. DiBattista et al., and is described in "A Microfabricated Hot Stage for Scanning Probe Microscopes" (1996), using integrated-circuit manufacturing technology. This approach is illustrated in the diagram of FIG. 1. In FIG. 1 the sample stage 10 is a silicon wafer of high resistivity, onto which is patterned a pair of electrical contacts 12a and 12b. A small region 14 located between contacts 12a, 12b is boron-doped so as to make it electrically conductive. Electrical current passed from contact 12a to 12b (or vice versa) will cause resistive heating in region 14 depending upon the level of boron doping in region 14 and the magnitude of the electrical current applied. Using this technique, the heated region can be made as small as 100 microns or so. While excellent results have been obtained with this system, only the heater itself (or thin films applied to the heater) have been studied so far. The system is too small for routine mounting of larger easily-handled samples. Furthermore, expensive microfabrication procedures are required for fabrication of this heating system.

Another approach, described by W. J. Kulnis, Jr. et al. in "A Thermal Stage for Nanoscale Structure Studies With the Scanning Force Microscope", Mat. Res. Soc. Symp. Proc. Vol. 332, pp. 105–108 (1994), uses a small Peltier thermoelectric device to heat the sample. Peltier thermoelectric devices use electric currents to carry heat from one side of the device to another, and usually find application as small coolers. However, because heat is actively transported across the device, the device itself serves as an excellent 'insulator'. The arrangement of the apparatus of W. K. Kulnis, Jr. et al. is shown in FIG. 2. In FIG. 2, a Peltier device 16 is glued onto an X-Y scanner 18 of a scanning probe microscope. A sample to be studied 20 is glued onto the hot side 22 of Peltier device 16, so that the whole assembly of Peltier device 16 and sample 20 is scanned under probe tip 24 of the scanning probe microscope. This arrangement is simple, however the heat applied to the sample 20 is removed from the cold side 26 of the Peltier device 16 causing thermal gradients at the scanner 18. The effect is small because much of the current applied to a Peltier device is consumed in Joule heating. However, a second limitation lies with the materials used to fabricate the Peltier device itself: the manufacturers of such devices recommend that they be run at temperatures below 60° C. to avoid damage to internal solder contacts and semiconductor elements, thus the available heating range is necessarily limited by this constraint to about 60° C. or less.

Yet another arrangement has been constructed by I. Musevic et al., in "Temperature controlled microstage for an atomic force microscope", Rev. Sci. Instrum. 67 (7), pp. 2554–2556 (July, 1996). The Musevic et al. arrangement is shown at FIG. 3. A heater assembly 28, consisting of a thin film 30 of indium-tin-oxide ("ITO") is coated onto the underside 32 of a glass slide 34, the underside 40 of which also serves as a support for a sample to be studied by a scanning probe microscope. Heat is developed in the heater assembly 28 by applying an electric current to a multicore, flexible copper wire (not shown) soldered to the ITO surface at diagonally facing corners of the ITO layer 30. The heater assembly 28 is mounted onto drops 36 of an epoxy adhesive which act as thermal insulating stand-off supports for the heater assembly 28 and hold it onto an X-Y scanner 38 of a scanning probe microscope. This arrangement is capable of heating the sample to higher temperatures than the Peltier-based heater of FIG. 2, but the entire thermal gradient must be sustained across the epoxy drops 36 and the air space between the ITO layer 30 and the scanner 38. The thermal gradient across these drops 36 results in excessive thermal drift for some applications. In addition, the inherently small size of drops 36 (typically about 2 mm in diameter) provides only very limited thermal isolation of the sample stage 40 from the rest of the microscope and thus the rest of the microscope is substantially radiatively heated when the stage is hot.

SUMMARY OF THE INVENTION

A heater for use in heating a sample stage of a microscope such as a scanning probe microscope is bonded to a sample stage which sits on a tube of a ceramic thermal insulator which is, in turn, mounted within or part of a tube of the same material. This re-entrant design provides an increased thermal path over straight line distances between the heater and the support structure for the sample stage and thus provides excellent thermal insulation, while also maximizing the thermal stability of the system.

OBJECTS AND ADVANTAGES OF THE INVENTION

Accordingly, it is an object and advantage of the present invention to provide a heated stage for a scanning probe microscope.

It is another object and advantage of the present invention to provide a heated sample stage for a microscope which, while operating in a room temperature and pressure environment is capable of heating samples to temperatures well in excess of one hundred degrees centigrade with minimal heating of the remainder of the microscope and minimum thermal drift of the assembly during heating.

Yet another object and advantage of the present invention is to provide a heated stage scanning probe microscope having a long thermal path between the heating element of the heated stage and other components of the microscope.

These and many other objects and advantages of the present invention will become apparent to those of ordinary skill in the art from a consideration of the drawings and ensuing description of the invention.

DESCRIPTION OF THE PREFERRED EMBODIMENTS

Those of ordinary skill in the art will realize that the following description of the present invention is illustrative only and is not intended to be in any way limiting. Other embodiments of the invention will readily suggest themselves to such skilled persons from an examination of the within disclosure.

Figure 1:
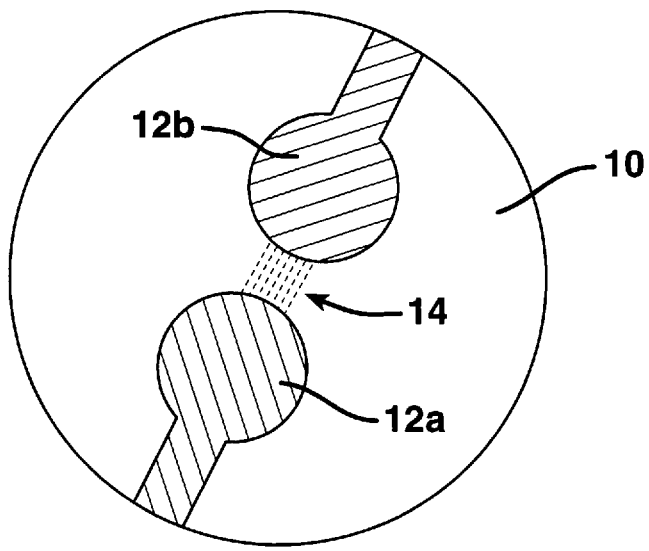
FIG. 1 depicts a silicon-based microfabricated sample stage according to the prior art.
Figure 2:
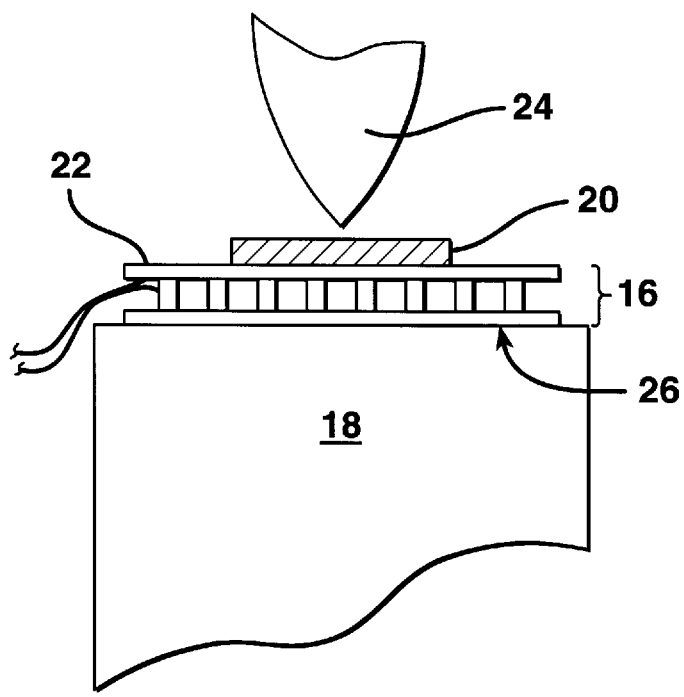
FIG. 2 depicts a Peltier heater according to the prior art.
Figure 3:
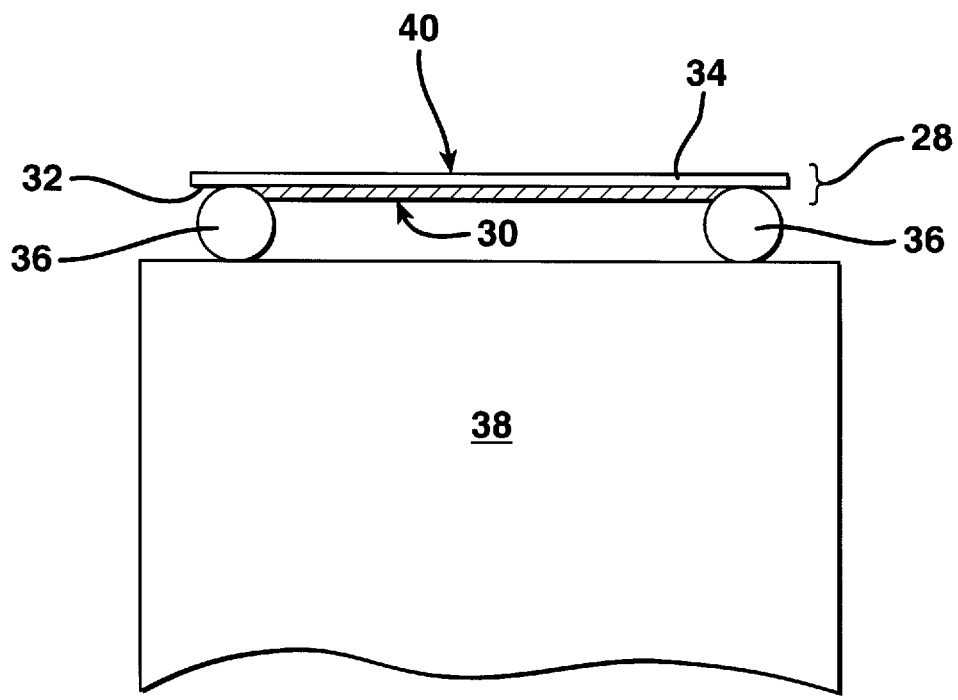
FIG. 3 depicts a thin-film heater according to the prior art.
Figure 4:
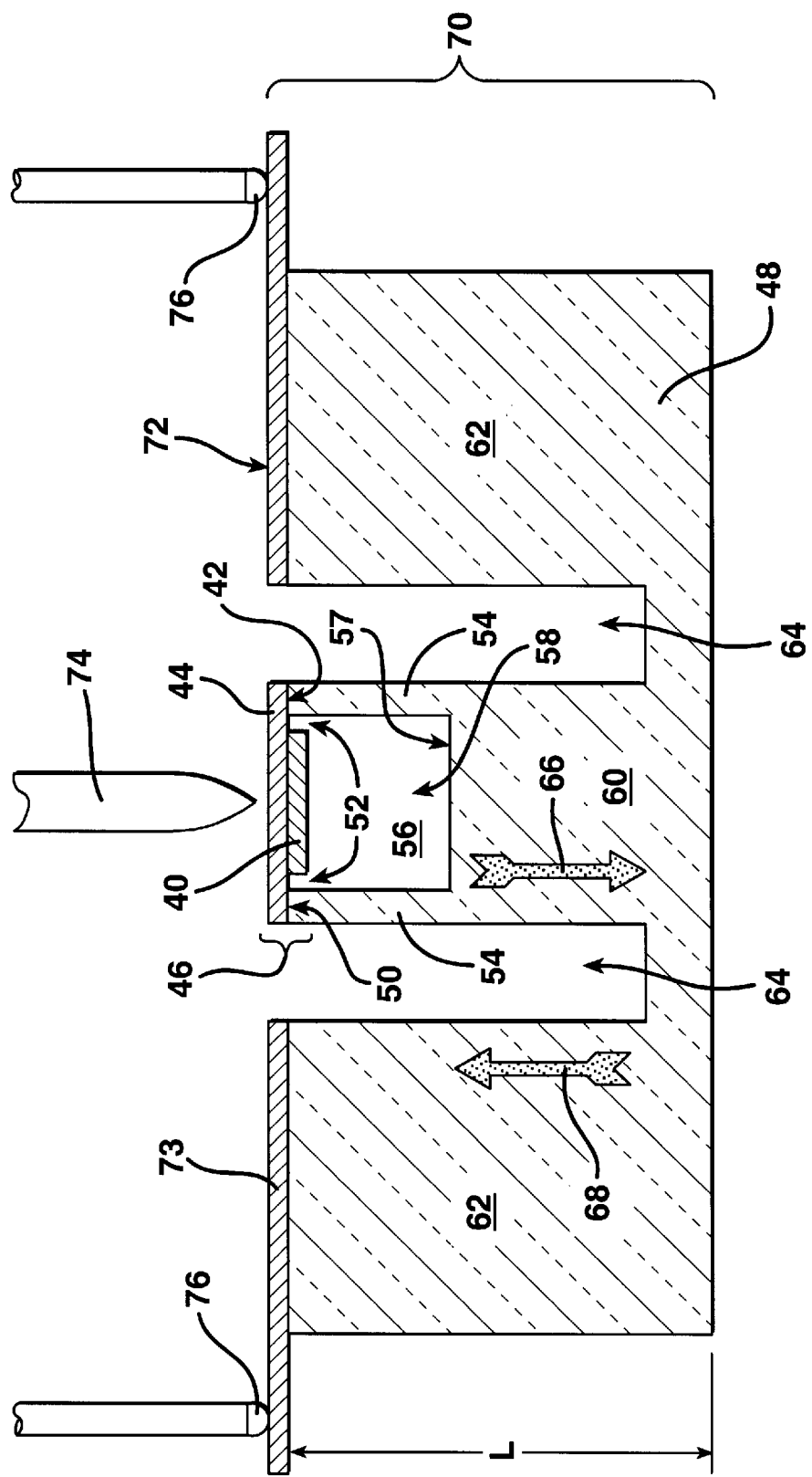
FIG. 4 is an elevational section of a heated stage for a scanning probe microscope in accordance with a presently preferred embodiment of the present invention.
Figure 5:
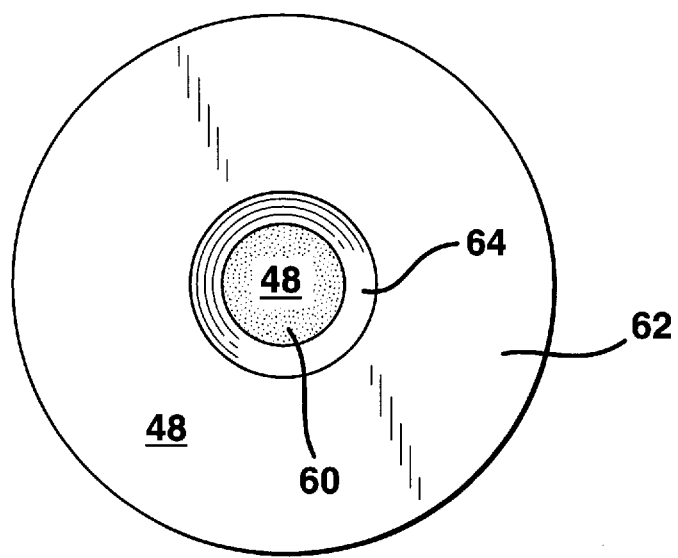
FIG. 5 is a top plan view of the heated stage of FIG. 4.

The present invention in its preferred embodiment is illustrated in FIGS. 4–5. Turning now to FIG. 4, a thin film heater element 40 is bonded to the underside 42 of a sample stage 44. Heater 40 is, according to a presently preferred embodiment of the present invention, a commercially available device printed on a thin Kapton film. An example of such a device is the Thermofoil heater from Minco Products of Minneapolis, Minn. Those of ordinary skill in the art will recognize that other heater materials could used, such as mica or ceramic films. Sample stage 44 itself is ideally made from a metal of high thermal conductivity such as copper. This minimizes thermal gradients across stage 44 and results in more rapid thermal stabilization. The stage/heater assembly 46 is mounted onto a thermally insulating support element 48 (preferably fabricated of a ceramic material such as alumina or Macor™, a machinable ceramic product available from Dow Chemical Corporation). Thermally insulating support element 48 is attached directly to the sample stage 44 at the outer periphery 50 of underside 42 of assembly 46. This is preferably arranged so as to leave an air gap 52 between heater 40 and ring-shaped support portion 54 of element 48 and an air gap 56 between heater 40 and the bottom 57 of cavity 58. Air gaps 52 and 56 in conjunction with ring-shaped support portion 54 of element 48 provide a means for supporting stage/heater assembly 46 without permitting heater 40 to contact support portion 54. Since heater 40 is fabricated from a polymer film (Kapton) which creeps on heating, greater thermal stability is achieved by leaving heater 40 attached only by its top side to underside 42 of sample stage 44.

Turning now to FIG. 5, element 48 preferably includes two concentric rods or tubes 60, 62. According to a presently preferred embodiment of the present invention, elements 60, 62 are fabricated from a single ceramic insulating element 48 by cutting a circular gap or generally torroidally-shaped void 64 partially through it. Those of ordinary skill in the art will also realize that an insulating material could be cast or otherwise formed in this way without the need for a cutting step. Turning now to FIG. 4, in this way, heat must first flow down element 60 as illustrated by arrow 66 and then back up element 62 as illustrated by arrow 68. This arrangement confers two important advantages. First, given a thickness, L, of element 48, the thermal path is increased to approximately 2 L, resulting in improved insulation of heating element 40 from the rest of the microscope. Second, if the temperature drops across each element 60, 62 were equal, then the expansion of the inner element 60 would be exactly compensated by the expansion of outer element 62, providing that the entire assembly 70 is supported by upper surface 72 of support sheet 73. In practice, this ideal is not achieved, but partial compensation of thermal expansion is still achieved.

According to a presently preferred embodiment of the present invention, heater 40 is attached to a circular platen or support sheet 73 (FIG. 4) of a scanning probe microscope such as the PicoSPMO® available from the Molecular Imaging Corporation of Tempe, Ariz. In that microscope, the sample platen or support sheet 73 is suspended below the scanning tip 74 (which may be an AFM tip or an STM tip) by means of magnetic mounts 76 (magnetized balls) which extend downwardly from a suspension mechanism and attract platen 73 which is made of a material attracted by magnets such as steel or other well known magnetically attractive materials. In accordance with this presently preferred embodiment, the heater element 40 is generally circular in shape with a thickness of 0.01" and a diameter of 0.8". Sample stage 44 is generally circular in shape with a diameter of 1" and a thickness of 0.1" and is formed of copper. It is attached at its outer periphery to supports 54 of element 48 by means of screws. Element 48 is generally circular in shape with a vertical thickness of 0.8" and a diameter of 2.5". Element 48 is formed of Macor™. Cavity 58 is generally circular in shape and is 0.1" deep vertically and has a diameter of 0.7". Cavity 58 is preferably formed by machining, but it could be molded for higher volume applications. Generally torroidally-shaped void 64 begins at radius=0.5" and ends at radius=0.6" as measured from the centerline of element 48 and has a vertical depth of 0.7". Void 64 is also preferably formed by machining, but for higher volume applications could also be molded as known to those of ordinary skill in the art. Support sheet 73 is formed of magnetic stainless steel and is generally circular in shape with a thickness of 0.12" and a diameter of 2.5". It is attached to element 48 by means of screws.

Alternative Embodiments

Those of ordinary skill in the art will realize that more complex versions of this design can be used to improve the performance, i.e., by extending the thermal path between heater 40 and the rest of the microscope. For example, circular cuts could be made alternately into the upper and lower surfaces of a ceramic piece, each cut being at a somewhat different radius from the center of element 48 (element 48 need not be round and the cuts need not be round but could be any shape so as to achieve the increased thermal path—it could also be fabricated of subassemblies glued or otherwise attached to one another as would be readily appreciated by those of ordinary skill in the art). The device would be supported after the outermost cut and the sample stage lie within the innermost. N sections would give a thermal path of approximately N*L, thus greatly increasing the thermal isolation of heater 40. Furthermore, this type of approach would tend to produce a more even temperature gradient across the entire heater/insulator/support assembly.

Figure 6:
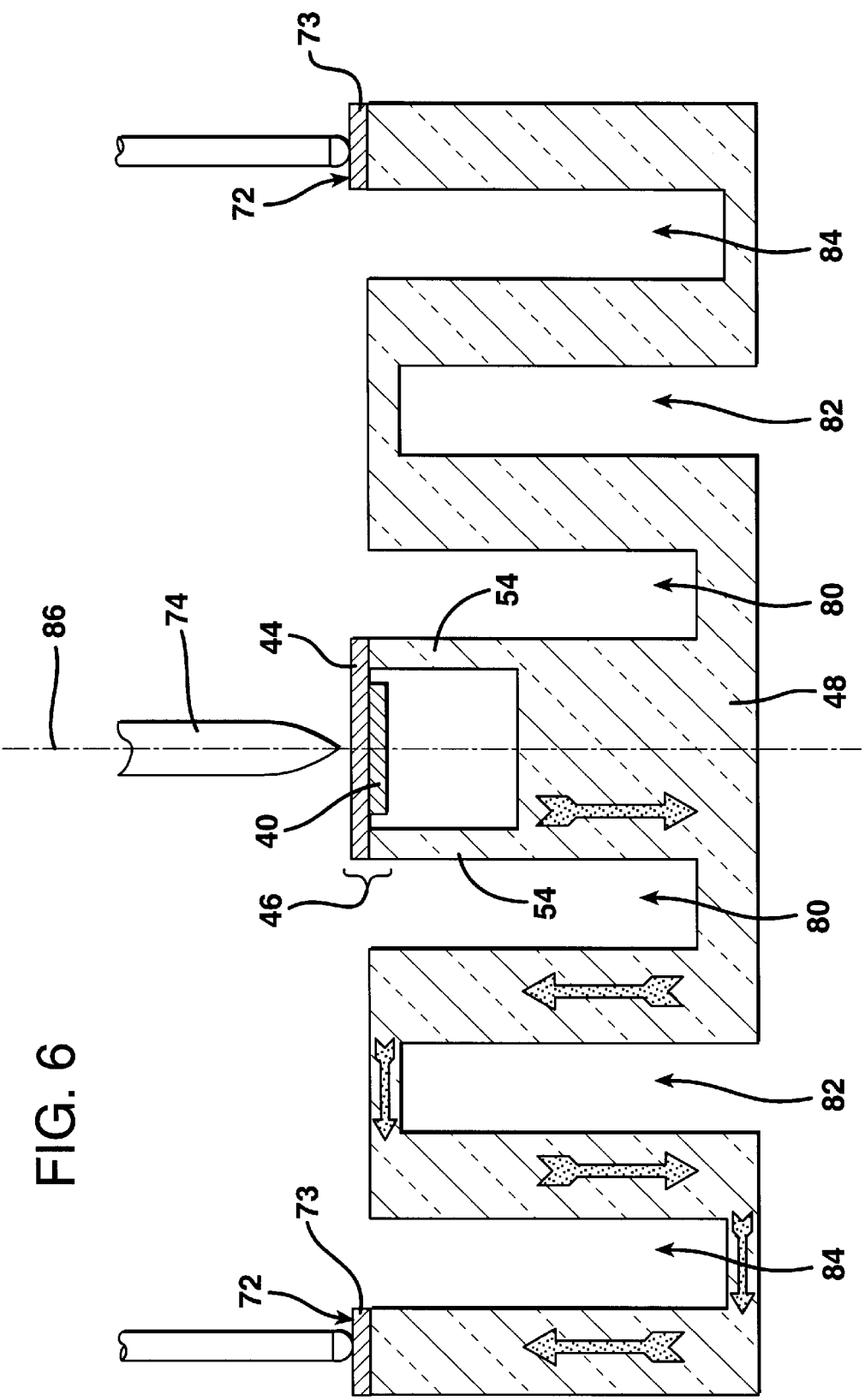
FIG. 6 is an elevational section of a heated stage for a scanning probe microscope in accordance with an alternative embodiment of the present invention.

An alternative embodiment of the invention in accordance with the discussion above is shown in FIG. 6. In this embodiment a total of three generally torroidally-shaped voids or air gaps 80, 82, 84 have been incorporated into the thermally insulating support element 48 at increasing radii from the center line 86 of thermally insulating support element 48 as shown. In this way, if the vertical thickness of element 48 is L, the thermal path from heater 40 to support sheet 73 is at least about 4 L (more, actually, if the radial distance travelled by the heat is taken into account). Thus, these simple structures provide a much improved mechanism for delivering stable heat to a sample under study.

Although illustrative presently preferred embodiments and applications of this invention are shown and described herein, many variations and modifications are possible which remain within the concept, scope, and spirit of the invention, and these variations would become clear to those of skill in the art after perusal of this application. The invention, therefore, is not to be limited except in the spirit of the appended claims.

What is claimed is:

1. A scanning probe microscope including a heated stage, said heated stage comprising:
    a support substrate having an upper surface and a lower surface, said upper surface adapted for supporting a sample under investigation by the scanning probe microscope;
    an electrically powered heating element thermally coupled to at least a portion of said lower surface of said support substrate;
    a thermally insulating support element engaged with said lower surface of said support substrate, said support element having a vertical thickness of L, said support element attached to the microscope at a plurality of peripheral points;
    at least one generally torroidally-shaped void in said support element disposed so as to increase the distance within said support element between said heating element and said peripheral points to at least about 2 L or greater.

2. A scanning probe microscope according to claim 1 wherein said support substrate comprises copper.

3. A scanning probe microscope according to claim 1 wherein said support sheet comprises steel.

4. A removable heated stage for a scanning probe microscope, said stage comprising:
    a support sheet of a material attracted by magnets adapted to be supported by magnets extending downwardly to engage an upper surface of said support sheet, said support sheet having an aperture therein;
    a thermally insulating block coupled to a lower surface of said support sheet, said thermally insulating block having a generally torroidally-shaped air gap therein, said torroidally-shaped air gap having a center along a vertical axis of said air gap;
    a support substrate accessible through said support sheet through said aperture and having an upper surface and a lower surface, said upper surface adapted for supporting a sample under investigation by the scanning probe microscope; and
    an electrically powered heating element thermally coupled to at least a portion of said lower surface of said support substrate and supported by a portion of said thermally insulating block over said center.

5. A removable heated stage according to claim 4 wherein said support substrate comprises copper.

6. A removable heated stage according to claim 4 wherein said support sheet comprises steel.

7. A removable heated stage for a scanning probe microscope, said stage comprising:
    a support sheet of a material attracted by magnets adapted to be supported by magnets extending downwardly to engage an upper surface of said support sheet, said support sheet having an aperture therein;
    a thermally insulating block coupled to a lower surface of said support sheet, said thermally insulating block having a generally torroidally-shaped air gap therein, said torroidally-shaped air gap having a center along a vertical axis of said air gap;
    a support substrate accessible through said aperture in said support sheet and having an upper surface and a lower surface, said upper surface adapted for supporting a sample under investigation by the scanning probe microscope; and
    an electrically powered heating element thermally coupled to at least a portion of said lower surface of said support substrate and supported by a portion of said thermally insulating block over said center.

8. A removable heated stage according to claim 7 wherein said support substrate comprises copper.

9. A removable heated stage according to claim 7 wherein said support sheet comprises steel.

* * * * *